(12) United States Patent
Takayama et al.

(10) Patent No.: US 6,203,118 B1
(45) Date of Patent: Mar. 20, 2001

(54) BRAKING SYSTEM

(75) Inventors: Toshio Takayama; Masaru Sakuma; Kunihiro Matsunaga, all of Yamanashi-ken (JP)

(73) Assignee: Tokico Ltd., Kanagawa-Ken (JP)

( * ) Notice: Subject to any disclaimer, the term of this patent is extended or adjusted under 35 U.S.C. 154(b) by 0 days.

(21) Appl. No.: 09/158,106

(22) Filed: Sep. 22, 1998

(30) Foreign Application Priority Data

Sep. 30, 1997 (JP) .................................... 9-283136

(51) Int. Cl.[7] .............................. B60T 8/32; B60T 13/66; F15B 9/10
(52) U.S. Cl. ................................. 303/113.4; 188/DIG. 1; 188/356; 303/114.3; 303/155; 303/113.3; 303/119.2
(58) Field of Search ............................ 303/114.3, 115.1, 303/115.2, 115.3, 113.4, 113.3, 155, 3, 125, 119.2; 188/355–359, DIG. 1; 91/369.1–369.4, 376 R; 60/550, 551, 552, 555; 701/70, 71, 79

(56) References Cited

U.S. PATENT DOCUMENTS

| | | | |
|---|---|---|---|
| 4,632,208 | * | 12/1986 | Takayama et al. . |
| 4,871,215 | * | 10/1989 | Takayama . |
| 5,350,224 | * | 9/1994 | Nell et al. .......................... 303/113.4 |
| 5,479,844 | | 1/1996 | Heibel et al. . |
| 5,590,937 | * | 1/1997 | Heibel ................................ 303/125 |
| 5,645,145 | * | 7/1997 | Ikeda ..................................... 188/356 |
| 5,647,462 | * | 7/1997 | Tsubouchi et al. ................. 91/376 R |
| 5,719,769 | | 2/1998 | Brugger et al. . |
| 5,772,290 | * | 6/1998 | Heibel et al. ....................... 303/113.4 |
| 5,779,329 | * | 7/1998 | Takeshima et al. .................. 303/155 |
| 5,833,327 | * | 11/1998 | Kozabai ............................. 303/113.4 |
| 5,845,556 | * | 12/1998 | Tsubouchi et al. ..................... 91/367 |
| 5,845,558 | * | 12/1998 | Tsubouchi et al. ................ 91/376 R |
| 5,851,057 | * | 12/1998 | Terazawa et al. ................. 303/113.4 |
| 5,931,545 | * | 8/1999 | Yonemura et al. ................... 303/155 |
| 6,003,426 | * | 12/1999 | Kobayashi et al. ................ 91/376 R |
| 6,065,388 | * | 5/2000 | Tsubouchi et al. . |

FOREIGN PATENT DOCUMENTS

WO 93/21048   10/1993   (WO) .

* cited by examiner

Primary Examiner—Douglas C. Butler
(74) Attorney, Agent, or Firm—Wenderoth, Lind & Ponack, L.L.P.

(57) ABSTRACT

When a stroke speed exceeds a reference value of a stroke speed threshold value, a solenoid is energized to tract an armature, thereby opening an atmospheric valve independently of the position of a plunger. Consequently, power pistons, together with an output rod, are moved forward by a thrust corresponding to a pressure difference between a constant-pressure chamber and a variable-pressure chamber to perform a full-power braking operation. A reaction-adjusting mechanism contributes to an improvement in safety by functioning in such a way that when the part of the reaction force from the output shaft that is transmitted to an input rod reaches a predetermined value, a boosting ratio is increased, so that the reference value of the stroke speed threshold value can be set high to prevent unnecessary braking.

6 Claims, 8 Drawing Sheets

BRAKING SYSTEM

BACKGROUND OF THE INVENTION

The present invention relates to a braking system having a brake-assisting mechanism that assists a driver in his/her braking operation in an emergency to produce an increased braking force.

One example of conventional braking systems having a brake-assisting mechanism is disclosed in Japanese Patent Application Unexamined Publication Number [hereinafter referred to as "JP(A)"] 61-268560.

The above-mentioned conventional braking system has a brake-assisting mechanism incorporated in a brake booster.

The booster is arranged as follows. When the brake pedal is depressed, a judgment is made as to whether or not there is an emergency situation in which the driver wants to stop or decelerate the vehicle immediately in order to avoid an accident, for example, on the basis of an output from a sensor that detects the speed at which the brake pedal is depressed. Under normal circumstances, a vacuum valve is closed by an input rod that moves in accordance with the pedal pressure applied to the brake pedal by the driver. At the same time, an atmospheric valve is opened by the movement of the input rod to supply a working fluid into a variable-pressure chamber, as in the case of the conventional system, thereby causing a differential pressure to act on a power piston to obtain a booster action. Under emergency conditions where the driver wants to stop or decelerate the vehicle immediately in order to avoid an accident, for example, the brake booster operates as follows. In addition to the above-described supply of working fluid by the movement of the input rod, a control valve is opened to supply the working fluid into the variable-pressure chamber, thereby causing an even greater differential pressure to act on the power piston to obtain an enhanced booster action. Thus, the driver is assisted in his/her braking operation to produce an increased braking force.

FIG. 7 shows an example of the control operation of a conventional controller used in the above-described brake booster to open the control valve by judging an emergency situation on the basis of the brake pedal depressing speed.

In the illustrated example, the controller reads a stroke signal sB from a pedal stroke sensor (not shown) in a predetermined control cycle (step S1). At the subsequent step S2, the controller obtains a difference VB between the stroke signal value sB(n−1) read in the preceding control cycle and the stroke signal valve sB(n) read at step S1 in the present control cycle. The control cycle is started at intervals of a predetermined time by timer interrupt processing, for example. By the above-described difference computation, a speed (stroke speed) VB is calculated. That is, the controller calculates a stroke speed corresponding to the difference VB at step S2. In the following description, the stroke speed will be denoted by reference character VB appropriately.

At the subsequent step S3, the controller multiplies a reference value Seo of a stroke speed threshold value by a vehicle speed coefficient F1(V) and a stroke coefficient F2(sB) to calculate a stroke speed threshold value Se.

The vehicle speed coefficient F1(V) has been preset according to the vehicle speed as stated in JP(A) 7-76267, by way of example. More specifically, when the vehicle speed is low, the vehicle speed coefficient F1(V) is set at a high value to prevent the brake-assisting mechanism from coming into operation uselessly in response to a vigorous operation of the brake pedal during driving for parking or reversing. When the vehicle is running smoothly at a normal speed, the vehicle speed coefficient F1(V) is set lower than the coefficient set when the vehicle speed is low [the coefficient F1(V) includes a minimum value], thereby allowing the brake-assisting mechanism to be readily activated by a vigorous operation of the brake pedal. When the vehicle speed is very high, the vehicle speed coefficient F1(V) is set higher than in the case of the normal smooth running speed. The driver tends to actuate the brake pedal vigorously when the vehicle speed is very high. Therefore, the brake-assisting mechanism is prevented from coming into operation uselessly in response to the vigorous brake pedal operation.

The stroke coefficient F2(sB) is set as stated in JP(A) 7-76267 by way of example. The contents of this publication are hereby incorporated by reference. That is, the stroke coefficient F2(sB) lowers stepwisely as the stroke of the brake pedal increases. For example, as the brake pedal stroke increases, the reaction force of the booster increases. Therefore, the stroke coefficient F2(sB) is set to compensate for the disadvantage that, as the brake pedal stroke increases, it becomes more difficult for the driver to obtain a high brake pedal depressing speed, and hence more difficult to activate the brake-assisting mechanism.

At the subsequent step S4, brake stiffness monitor processing is executed to calculate a stiffness coefficient Kw.

The brake stiffness monitor processing is such as that shown in JP(A) 8-207721, by way of example. More specifically, monitoring is performed to detect a change in the reaction characteristics of the braking system due to a change in the elasticity of a diaphragm provided on the power piston of the booster or wear of the brake pads, for example, on the basis of the relationship between data such as the brake pedal stroke and the vehicle speed. When a change in the reaction characteristics is detected, a stiffness coefficient Kw is calculated to compensate for an influence due to the reaction characteristic change.

At the subsequent step S5, a driver's operating habit monitor processing is executed to calculate an operating habit coefficient.

The driver's operating habit monitor processing is such as that shown in JP(A) 7-156786, by way of example. The contents of this publication are hereby incorporated by reference. An operating habit coefficient is obtained as a correction coefficient concerning each individual driver. After completion of a braking operation conducted by each particular driver, an operating habit coefficient concerning the driver is calculated. More specifically, a characteristic coefficient K is calculated on the basis of a maximum stroke speed VBm and maximum stroke sBm of the brake pedal obtained during the braking operation. A preset model driver's operating habit coefficient (=1) is multiplied by the characteristic coefficient K to determine an operating habit coefficient unique to the driver concerned.

At the subsequent step S6, the stroke speed threshold value Se obtained at the previous step S3 is multiplied by the stiffness coefficient Kw and the operating habit coefficient to obtain a corrected stroke speed threshold value. Then, a comparison is made to judge whether or not the stroke speed VB obtained previously is greater than the corrected stroke speed threshold value, thereby deciding whether the present situation is an emergency or not.

If YES is the answer at step S6, that is, if the present situation is judged to be an emergency, the solenoid of the control valve is driven to open the valve. Consequently, the working fluid is supplied into the variable-pressure chamber from the working fluid source through the control valve in addition to the supply of working fluid into the variable-pressure chamber by the vacuum and atmospheric valves actuated by the movement of the input rod as in the case of the conventional system. By doing so, an even greater differential pressure is produced to act on the power piston to obtain a booster action, thereby assisting the driver in his/her braking operation to produce an increased braking force.

Then, the above-described control (subroutine) having steps S1 to S7 is terminated. This control operation is repeatedly executed in a predetermined control cycle.

In a braking system having a brake-assisting mechanism that assists the driver in his/her braking operation in an emergency to produce an increased braking force as stated above, the brake-assisting mechanism should be activated only in an emergency situation in which the operation of the brake-assisting mechanism is actually needed. It should not be activated in a situation of low emergency level.

For this reason, as stated in connection with FIG. 7, the setting of a stroke speed threshold value for a judgment as to whether or not the present situation is an emergency that needs the brake-assisting mechanism to be activated must be adjusted finely according to the vehicle speed and the brake pedal stroke. Furthermore, even when the same pedal pressure is applied to the brake pedal, the brake depressing speed may vary owing, for example, to a change in the elasticity of the diaphragm provided on the power piston of the booster or wear of the brake pads. Therefore, the stroke speed threshold value must be corrected by also monitoring the brake stiffness at all times.

Moreover, there are differences among individuals in the brake pedal pressure applied in an emergency (i.e. the way in which the brake pedal is actuated). In other words, the way in which one individual depresses the brake pedal in an emergency situation may be within the range of the way in which another individual depresses the brake pedal in a normal situation. Therefore, the stroke speed threshold value must be corrected according to each individual's operating habit.

Accordingly, the setting of coefficients for these correction operations is complicated and requires preliminary studies to be conducted on a large number of drivers at much expense in time and effort.

Even if the stroke speed threshold value is corrected strictly by expending much effort, the way in which the brake becomes effective in response to the actuation of the brake pedal may change greatly at a stroke speed around the corrected stroke speed threshold value. This may confuse the driver's sense of controlling the brake pedal.

SUMMARY OF THE INVENTION

In view of the above-described circumstances, an object of the present invention is to provide a braking system having a brake-assisting mechanism that is capable of ensuring safety and operability and that enables an increased braking force to be produced in an emergency by an easy control operation.

To attain the above-described object, the present invention provides a braking system including a booster having a housing and a power piston that divides the inside of the housing into a constant-pressure chamber and a variable-pressure chamber. A valve body is supported by the power piston, and a valve mechanism is provided in the valve body to control supply of a working fluid into the variable-pressure chamber by movement of a plunger connected to an input rod interlocked with a brake pedal. The booster is arranged as follows. A thrust that is produced in the power piston by a differential pressure produced between the variable-pressure chamber and the constant-pressure chamber on the basis of the operation of the valve mechanism is transmitted to an output rod, and a part of reaction force from the output rod is transmitted through a reaction member and the plunger to act on the input rod. The braking system further includes a control valve device provided in communication with the variable-pressure chamber of the booster to supply the working fluid into the variable-pressure chamber in response to a driving signal inputted thereto. The braking system further includes a stroke detecting device that detects a stroke of the brake pedal, and a control-valve drive control device that compares a stroke speed of the brake pedal based on the result of detection by the stroke detecting device with a preset threshold value. When the stroke speed exceeds the threshold value, the control-valve drive control device outputs a driving signal to the control valve device. In addition, the braking system includes a reaction-adjusting mechanism arranged such that, when the part of reaction force from the output rod that is transmitted through the reaction member and the plunger to act on the input rod has reached a predetermined value, the reaction-adjusting mechanism reduces the proportion of the reaction force acting on the input rod to a level lower than before the predetermined value is reached.

According to one embodiment of the present invention, the valve mechanism includes a valve element provided in the valve body and a plunger movable in the valve body and connected to the input rod. The valve mechanism further includes an armature having a valve seat portion adapted to abut on the valve element and an engagement portion engageable with the plunger. The armature is movable in the valve body and urged such that the engagement portion normally abuts on the plunger. The control valve device includes the armature and a solenoid that generates magnetic force acting on the armature such that the armature separates from the valve element. The reaction-adjusting mechanism includes a reaction receiver provided between the reaction member and the plunger so as to be movable relative to the plunger and able to abut on the reaction member. The reaction-adjusting mechanism further includes a spring member provided between the reaction receiver and the plunger. An adjusting member is provided between the reaction receiver and the plunger to adjust an initial separation between the reaction receiver and the plunger and a set load of the spring member that is applied to the reaction receiver.

According to another embodiment of the present invention, the valve mechanism includes a valve element provided in the valve body and a plunger movable in the valve body and connected to the input rod. The valve mechanism further includes an armature having a valve seat portion adapted to abut on the valve element and an engagement portion engageable with the plunger. The armature is movable in the valve body and urged such that the engagement portion normally abuts on the plunger. The control valve device includes the armature and a solenoid that generates magnetic force acting on the armature such that the armature separates from the valve element. The reaction-adjusting mechanism has a recess formed in a portion of the valve body that is in contact with the reaction member. The recess accommodates the distal end of the plunger. The recess allows the effective pressure-receiving area of the plunger to vary according to the magnitude of output reaction force.

DETAILED DESCRIPTION OF THE INVENTION

A braking system according to a first embodiment of the present invention will be described below with reference to FIGS. 1 to 5.

Figure 1:
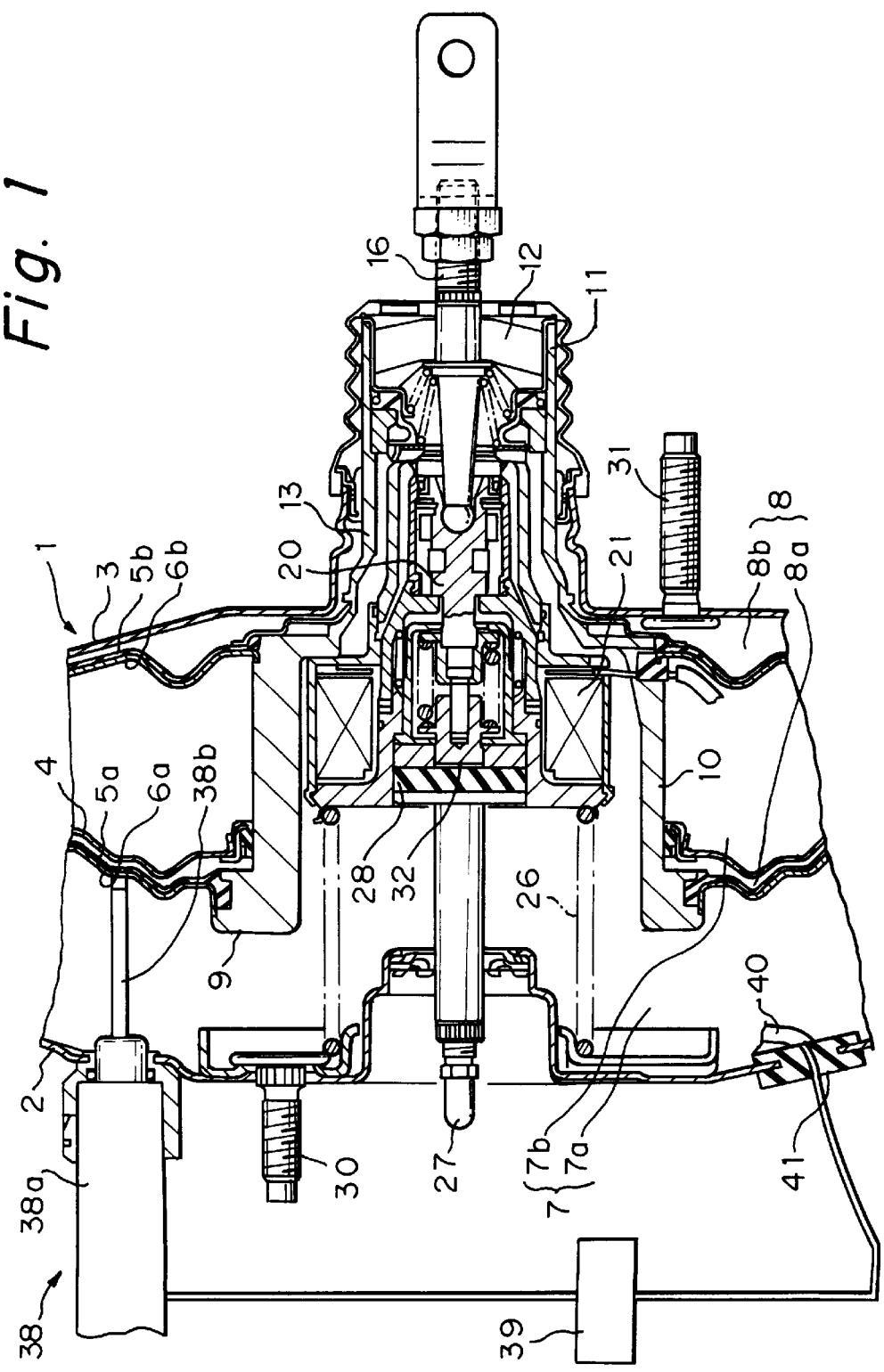
FIG. 1 is a sectional view showing a braking system according to a first embodiment of the present invention.
Figure 2:
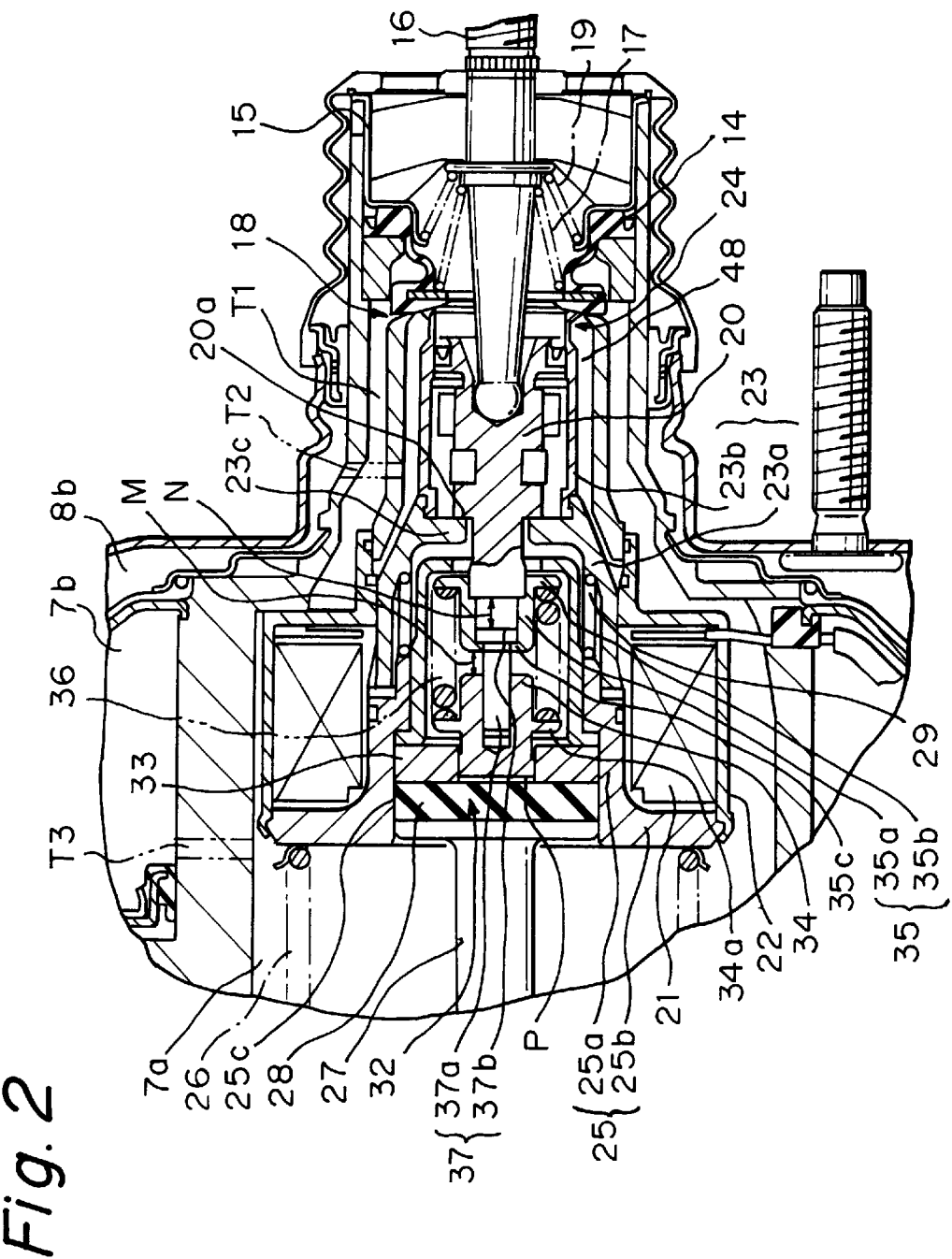
FIG. 2 is an enlarged view showing a part of the braking system shown in FIG. 1.
Figure 7:
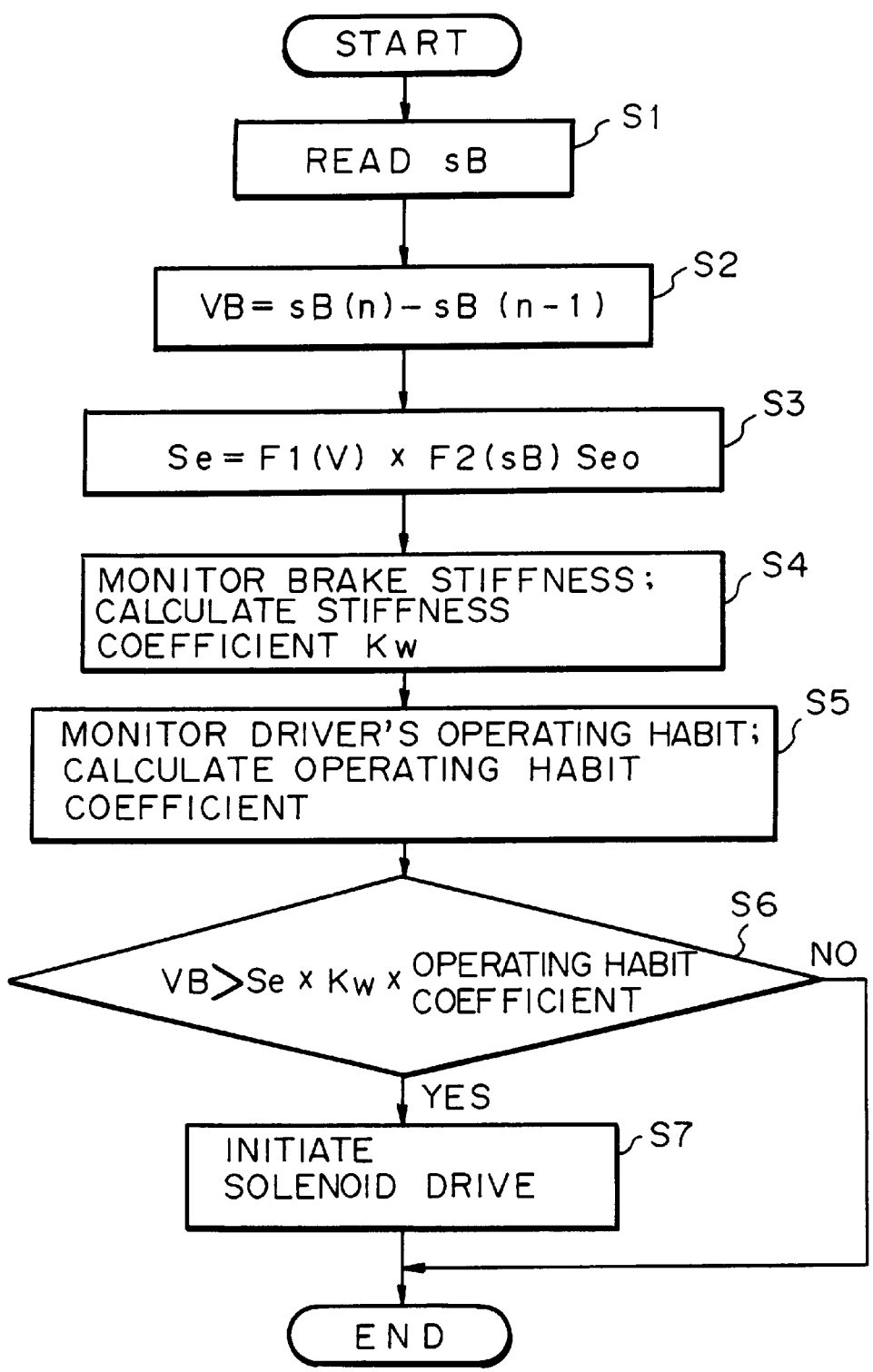
FIG. 7 is a flowchart showing the contents of a control operation executed in one example of conventional braking systems.

It should be noted that the same control steps as those shown in FIG. 7 are denoted by the same reference characters, and a description thereof is omitted appropriately. In FIGS. 1 and 2, a housing 1 consists essentially of a front shell 2 and a rear shell 3. The inside of the housing 1 is divided by a center shell 4 into front and rear chambers (not given reference characters). The front chamber is divided into a front constant-pressure chamber 7a and a front variable-pressure chamber 8a by a power piston 6a having a diaphragm 5a. The rear chamber is divided into a rear constant-pressure chamber 7b and a rear variable-pressure chamber 8b by a power piston 6b having a diaphragm 5b.

In this embodiment, the housing 1, a valve mechanism, a reaction disk 28, a plunger 20, etc. (described later) constitute a booster.

A generally cylindrical valve body 9 is secured to the power pistons 6a and 6b. The valve body 9 has a cup-shaped large-diameter cylindrical portion 10, one end of which is closed, and a small-diameter cylindrical portion 11 that is contiguous with the large-diameter cylindrical portion 10. The large-diameter cylindrical portion 10 is fitted to the power pistons 6a and 6b in an airtight manner and slidably extends through the center shell 4 in an airtight manner. The small-diameter cylindrical portion 11 slidably extends through the rear shell 3 in an airtight manner to project rearward. A filter 12 having a silencer function and an air-cleaning function is accommodated in an open-end portion of the small-diameter cylindrical portion 11. Atmospheric air is introduced into the valve body 9 through the filter 12.

The small-diameter cylindrical portion 11 has a thick-walled portion 13 at a side thereof which is closer to the large-diameter cylindrical portion 10. The thick-walled portion 13 is provided with an axially extending passage T1, one end of which opens at the open-end of the large-diameter cylindrical portion 10. The other end of the passage T1 opens at the distal end of the small-diameter cylindrical portion 11. The thick-walled portion 13 is further provided with a radially extending passage T2, one end of which opens in the rear variable-pressure chamber 8b. The other end of the passage T2 opens inside the thick-walled portion 13 (the passage T2 is shown schematically for the sake of convenience).

Furthermore, the valve body 9 is provided with a passage T3 that provides communication between the front and rear constant-pressure chambers 7a and 7b. The valve body 9 is further provided with a passage (not shown) that provides communication between the front and rear variable-pressure chambers 8a and 8b. In the following description, the front and rear constant-pressure chambers 7a and 7b will be generally referred to as a "constant-pressure chamber 7", and the front and rear variable-pressure chambers 8a and 8b as a "variable-pressure chamber 8" for the sake of convenience. The constant-pressure chamber 7 is connected to a vacuum source (not shown), e.g. a suction device of the engine, and the inside of the constant-pressure chamber 7 is kept at a vacuum at all times.

An elastically deformable valve element 14 is secured at a proximal end thereof by a retaining member 15 in the small-diameter cylindrical portion 11 near the opening of the passage T1. A spring 17 is provided between the distal end of the valve element 14 and an input rod 16 to urge the valve element 14 toward the opening (valve seat) of the passage T1, thereby closing the passage T1. The valve element 14 and the opening (valve seat) of the passage T1 constitute a vacuum valve 18.

A return spring 19 is provided between the retaining member 15 and the input rod 16 to urge the input rod 16 rearward.

The input rod 16 is interlocked with a brake pedal (not shown) and inserted into the small-diameter cylindrical portion 11. The distal end of the input rod 16 is provided with a shaft-shaped plunger 20 that is engaged by the input rod 16.

A solenoid 21 is placed on the bottom of the large-diameter cylindrical portion 10 in concentric relation to the input rod 16. The solenoid 21 is held in the large-diameter cylindrical portion 10 through an approximately cylindrical solenoid-retaining member 22. A generally cylindrical armature 23 is axially movably placed inside the solenoid 21. The armature 23 is driven by the solenoid 21 to move back and forth. When excited, the solenoid 21 produces magnetic force to separate the armature 23 from the valve element 14. In this case, the armature 23 is positioned in a place displaced toward the input rod 16 relative to the center of the solenoid 21.

The armature 23 consists essentially of a large-diameter armature body 23a and an armature auxiliary member 23b that is fastened to the armature body 23a. The armature auxiliary member 23b is a cylindrical member having a diameter smaller than that of the armature body 23a. The armature body 23a has a bottom portion (engagement portion) 23c that is provided with a hole (not given a reference character) for passing the plunger 20. A step portion 20a of the plunger 20 abuts on the bottom portion 23c, so that as the plunger 20 moves forward, the armature 23 can move forward in association with the plunger 20.

The distal end portion of the armature auxiliary member 23b is able to abut on the distal end portion of the valve element 14. When abutting on the distal end portion of the valve element 14, the armature auxiliary member 23b cuts off the passage T2 from the atmosphere. When separating from the distal end portion of the valve element 14, the armature auxiliary member 23b provides communication between the passage T2 and the atmosphere to introduce the atmospheric air into the rear variable-pressure chamber 8b and the front variable-pressure chamber 8a. The armature auxiliary member 23b and the valve element 14 constitute an atmospheric valve 24.

In this embodiment, the valve element 14, the plunger 20 and the armature 23 constitute a valve mechanism. The armature 23 and the solenoid 21 constitute a control valve device.

A disk-accommodating member 25 is fitted into one end portion of the solenoid-retaining member 22 (i.e. the leftward end portion as viewed in FIG. 1). The disk-accommodating member 25 has an accommodating cylindrical portion 25a and a ring-shaped flange portion 25b. The flange portion 25b is secured to the solenoid-retaining member 22. The cylindrical portion 25a extends into the solenoid 21. A return spring 26 is provided between the disk-accommodating member 25 and the front shell 2 to urge the disk-accommodating member 25, together with the valve body 9, rearward (rightward as viewed in FIG. 1).

A bore 25c is formed in the disk-accommodating member 25 to accommodate the proximal end portion of an output rod 27 and a reaction disk (reaction member) 28 made of an elastic material, e.g. a rubber material. The distal end portion of the output rod 27 extends through the front shell 2 in an airtight manner and projects forward. The projecting end of the output rod 27 is connected to a master cylinder (not shown). A spring 29 is provided between the cylindrical portion 25a and the armature body 23a to urge them away from each other. A stud bolt 30 is on the front shell 2. The master cylinder is integrally secured to this system through the stud bolt 30. A stud bolt 31 is on the rear shell 3. The booster is secured to a vehicle body (not shown) through the stud bolt 31.

A reaction-adjusting mechanism 32 is provided between the reaction disk 28 and the plunger 20 in the bore 25c of the disk-accommodating member 25 and the armature body 23a.

The reaction-adjusting mechanism 32 consists essentially of a ring-shaped intermediate member 33 provided in parallel to the reaction disk 28; a cylindrical reaction receiver 34, one end of closed and which is inserted into a bore in the intermediate member 33; a hat-shaped spring retainer 35 provided on the distal end portion of the plunger 20; a compression spring 36 provided between a flange 34a of the reaction receiver 34 and the spring retainer 35; and an adjusting rod 37 that applies a predetermined set load to the compression spring 36. In an initial state shown in FIG. 1 (FIG. 2), a predetermined gap is formed between the reaction receiver 34 and the reaction disk 28.

In the reaction-adjusting mechanism 32, the set load applied to the compression spring 36 is adjusted in advance so that when a part of reaction force acting on the input rod 16 from the output rod 27 through the reaction disk 28 and the plunger 20 has reached a predetermined value [a value corresponding to point C in FIG. 4 (described later)], the proportion of the reaction force acting on the input rod 16 is reduced to a level lower than that before the predetermined value is reached (see the output region D in FIG. 4).

The spring retainer 35 has a cylindrical portion (hereinafter referred to as "spring-retaining cylindrical portion") 35a, one end of which is closed, and a flange (hereinafter referred to as "spring-retaining flange") 35b formed at the open end of the spring-retaining cylindrical portion 35a. A bottom 35c of the spring-retaining cylindrical portion 35a is provided with a bore (not given a reference character) for axially movably passing a shaft portion 37a of the adjusting rod 37. The distal end portion of the plunger 20 is fitted in the opening of the spring-retaining cylindrical portion 35a.

The shaft portion 37a of the adjusting rod 37 extends through the bore in the bottom 35c of the spring-retaining cylindrical portion 35a and is secured in the hole of the reaction receiver 34 by press-fitting. The head portion 37b of the adjusting rod 37 is axially movable in the spring-retaining cylindrical portion 35a and stopped by the bottom 35c of the spring-retaining cylindrical portion 35a. The set load applied to the compression spring 36 is adjustable by changing the length by which the adjusting rod 37 is inserted into the hole of the reaction receiver 34.

In an assembled state where a load that is greater than the set load is not applied to the compression spring 36, the length N from the head portion 37b of the adjusting rod 37 to the distal end of the plunger 20 is longer than the length M from the reaction receiver 34 to the bottom 35c of the spring-retaining cylindrical portion 35a (N>M). Accordingly, when the compression spring 36 is being contracted, the head portion 37b of the adjusting rod 37 is movable in the spring-retaining cylindrical portion 35a until the bottom 35c of the spring-retaining cylindrical portion 35a comes into contact with the reaction receiver 34.

A body portion 38a of a stroke sensor (stroke detecting device) 38 is fitted in the front shell 2 in an airtight manner. A movable shaft 38b is axially movably supported by the body portion 38a of the stroke sensor 38. The distal end of the movable shaft 38b is connected to the power piston 6a to detect the travel position of the power piston 6a, that is, the travel position of the valve body 9.

A controller (control-valve drive control device) 39, which is placed outside the housing 1, is connected to the stroke sensor 38 and the solenoid 21. A connecting line 40 that connects the solenoid 21 and the controller 39 extends through a grommet 41 fitted in the front shell 2 in an airtight manner.

When the stroke speed VB exceeds a reference value Seo, the controller 39 energizes the solenoid 21 to obtain a large output, as described later.

Figure 3:
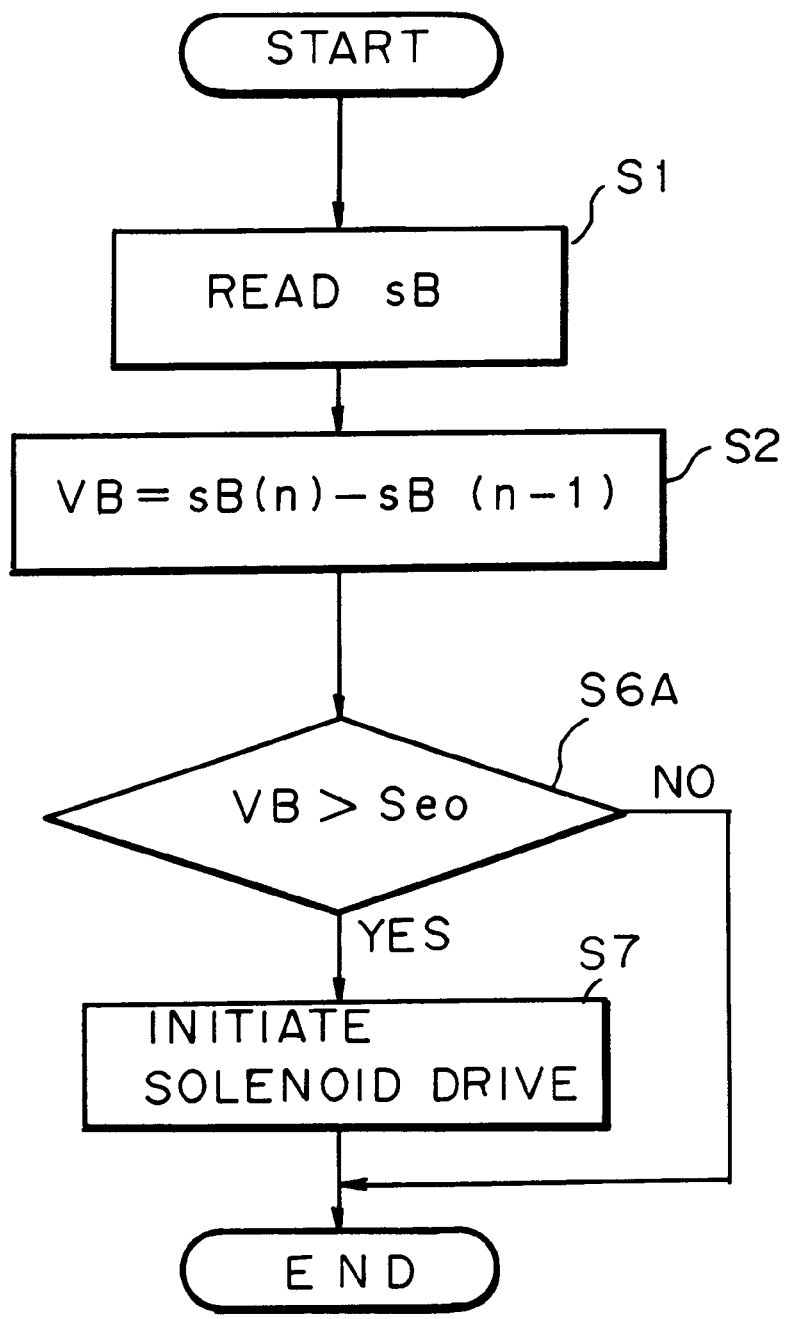
FIG. 3 is a flowchart showing the contents of a control operation executed by a controller of the braking system shown in FIG. 1.

The controller 39 executes arithmetic processing as shown in FIG. 3. That is, the controller 39 reads a stroke signal sB from the stroke sensor 38 (step S1), and obtains a stroke speed VB at the subsequent step S2. Next, the controller 39 judges whether or not the stroke speed VB is in excess of the reference value Seo (step S6A). If YES is the answer at step S6A, the controller 39 energizes the solenoid 21 to open the atmospheric valve 24 (step S7) independently from the operation of the reaction-adjusting mechanism 32.

The operation of the braking system, arranged as described above, will be described below.

When the braking system is in the initial state as shown in FIG. 1 (FIG. 2), the constant-pressure chamber 7 and the variable-pressure chamber 8 are at a constant pressure (negative pressure), and the atmospheric valve 24 and the vacuum valve 18 are closed. If the input rod 16 is pushed under these conditions, the plunger 20, the armature 23 and the reaction-adjusting mechanism 32 move in the respective gaps between the reaction disk 28, the reaction-adjusting mechanism 32 and the plunger 20, causing the armature auxiliary member 23b to separate from the valve element 14 (i.e. the atmospheric valve 24 is opened). Consequently, the atmospheric air flows into the rear variable-pressure chamber 8b (and the front variable-pressure chamber 8a) through a space 48 between the small-diameter cylindrical portion 11 and the armature 23 and further through the passage T2. As a result, a differential pressure is produced between the rear constant-pressure chamber 7b and the rear variable-pressure chamber 8b, and a differential pressure is also produced between the front constant-pressure chamber 7a and the front variable-pressure chamber 8a. This causes the power pistons 6a and 6b to move forward, together with the valve body 9. Consequently, a thrust is produced in the output rod 27, and a braking action is initiated.

In this initial state of the braking operation, the reaction receiver 34 of the reaction-adjusting mechanism 32 moves in the gap between the reaction disk 28 and the reaction receiver 34, thereby allowing the atmospheric valve 24 to be opened without receiving reaction force from the reaction disk 28. Therefore, it is possible to obtain a sufficient initial braking force (see the jump-in quantity shown in the output region A in FIG. 4).

Thereafter, when the plunger 20 further moves forward and a part of the reaction disk 28 is deformed to swell toward the reaction receiver 34, a part of the output reaction force is transmitted from the reaction receiver 34 to the compression spring 36, which has been compressed under the set load, and also to the plunger 20 and the input rod 16 through the deformed reaction disk 28. Consequently, the output increases in proportion to the input (see the output region B in FIG. 4). In this case, the compression spring 36 is not compressed (shortened) any further from the set state; therefore, the reaction receiver 34 and the plunger 20 are under the same conditions as if they are joined together by a rigid body.

When the brake pedal pressure reaches the set load of the reaction-adjusting mechanism 32 (compression spring 36), the compression spring 36 begins to contract. As a result, the line segment representing the input/output characteristics bends at point C. Consequently, the boosting ratio (i.e. the ratio of the output from the output rod 27 to the input to the input rod 16, which is represented by the angle of inclination of the line segment shown in FIG. 4) becomes higher than the boosting ratio in the output region B (see the output region D in FIG. 4).

Figure 4:
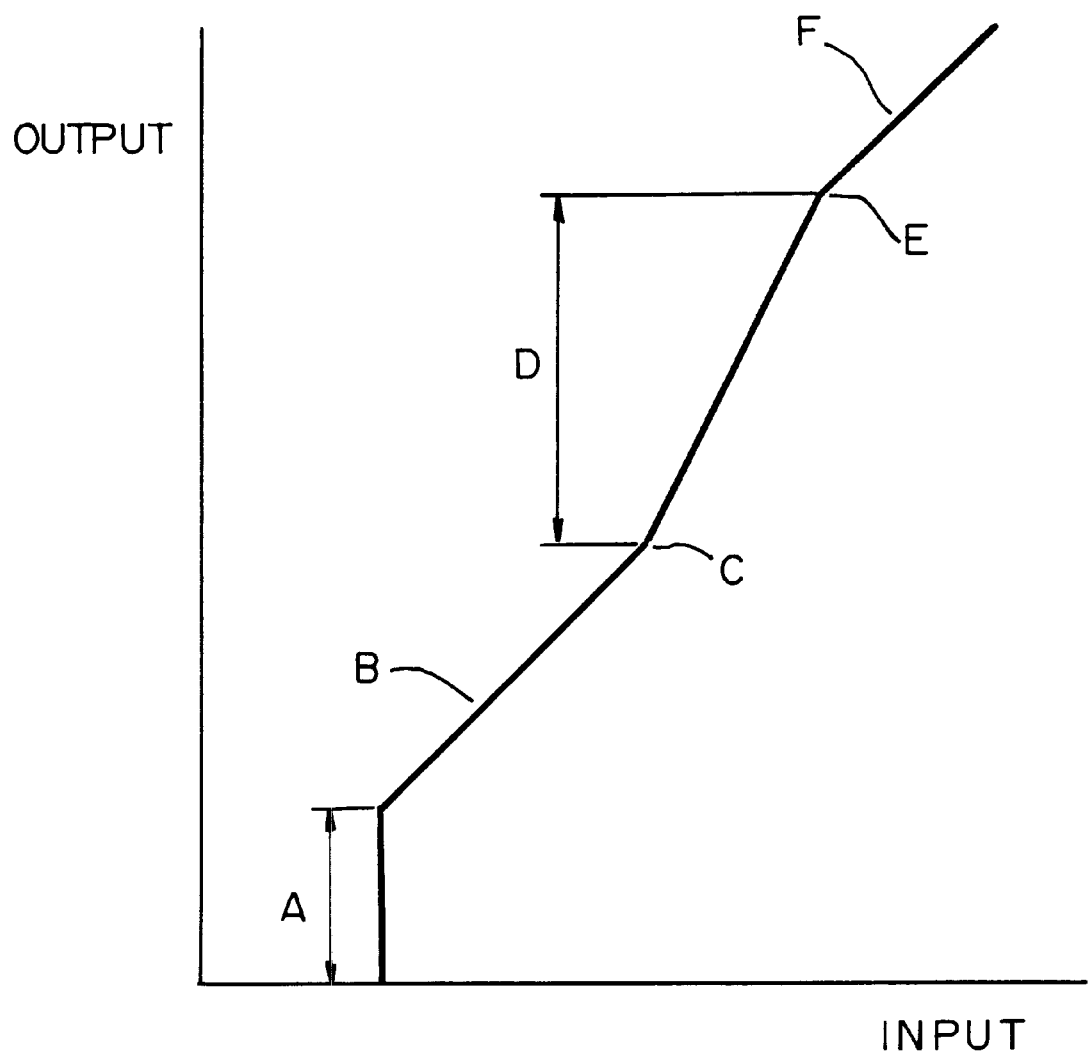
FIG. 4 is a diagram showing input/output characteristics of the braking system shown in FIG. 1.

It should be noted that the reason why the boosting ratio in the output region D becomes higher than the boosting ratio in the output region B is that when a part of the reaction force acting on the input rod 16 from the output rod 27 through the reaction disk 28 and the plunger 20 has reached a predetermined value, the proportion of the reaction force acting on the input rod 16 is reduced to a level lower than that before the predetermined value is reached (see the output region D in FIG. 4).

The reason why "the boosting ratio is raised" by "reducing the proportion of the reaction forces" will be described below.

In the initial state shown in FIG. 2, the constant-pressure chambers 7a and 7b and the variable-pressure chambers 8a and 8b are at a constant pressure (negative pressure), and the atmospheric valve 24 is closed, as has been stated above.

When the brake pedal is actuated in this state and thus the input rod 16 is pressed, the plunger 20, which is connected to the input rod 16, moves forward, as stated above. The armature 23 also moves forward due to existence of the step portion 20a, causing the end portion of the armature auxiliary member 23b to separate from the valve element 14. Consequently, the atmospheric valve 24 is opened with the vacuum valve 18 closed. As a result, the atmospheric air flows into the variable-pressure chambers 8a and 8b, causing a differential pressure to be produced between the constant-pressure chambers 7a and 7b on the one hand and the variable-pressure chambers 8a and 8b on the other. The differential pressure causes the power pistons 6a and 6b to move forward, producing an output that causes the output rod 27 to move forward through the reaction disk 28. At this time, the reaction disk 28 is deformed by reaction force applied thereto from the output rod 27 and comes into contact with the reaction receiver 34 of the reaction-adjusting mechanism 32, filling the gap P of predetermined width that is formed between the reaction receiver 34 and the reaction disk 28. Thus, the reaction disk 28 presses the reaction receiver 34. As a result, a part of the reaction force from the output rod 27 acts on the input rod 16 through the reaction-adjusting mechanism 32 and the plunger 20, giving normal feel of resistance to the depression of the brake pedal (see the jump-in quantity shown in the output region A in FIG. 4).

During the period between this point and the instant the brake pedal pressure reaches a predetermined value, the part of the reaction force transmitted to the reaction-adjusting mechanism 32 through the reaction disk 28 is smaller than the predetermined set load of the compression spring 36. Therefore, the compression spring 36 is not compressed (shortened). Accordingly, the reaction force is transmitted to the plunger 20 as in the case of transmission through a rigid body. Thus, it is possible to produce a servo power corresponding to the brake operating force in a predetermined boosting ratio (see the output region B in FIG. 4).

When the brake pedal pressure exceeds the predetermined value, the part of the reaction force transmitted to the reaction-adjusting mechanism 32 through the reaction disk 28 is greater than the predetermined set load of the compression spring 36. Therefore, the compression spring 36 is compressed in accordance with the magnitude of the part of the reaction force transmitted to the reaction-adjusting mechanism 32, and the reaction receiver 34 moves relatively toward the plunger 20, that is, the spring retainer 35. As a result, the reaction receiver 34 of the reaction-adjusting mechanism 32 moves away from the reaction disk 28 by a distance corresponding to the amount of compression of the compression spring 36 with respect to the given position of the displaced power pistons 6a and 6b. Consequently, the gap P formed between the reaction receiver 34 and the reaction disk 28 enlarges by an amount corresponding to the compression of the compression spring 36, resulting in an increase in the jump-in quantity (output region A) shown in FIG. 4.

Thus, when the brake pedal pressure is in excess of the predetermined value, the part of the reaction force transmitted to the reaction-adjusting mechanism 32 through the reaction disk 28 is greater than the predetermined set load of the compression spring 36. Consequently, the compression spring 36 is compressed in accordance with the magnitude of the part of the transmitted reaction force, and the jump-in quantity increases by an amount corresponding to the compression of the compression spring 36. Therefore, the boosting ratio becomes apparently higher than in the case where the brake pedal pressure is not in excess of the predetermined value (see the output region D in FIG. 4).

Thus, the reaction-adjusting mechanism 32 in this embodiment obtains 2-ratio characteristics as shown in the output regions B and D in FIG. 4.

As the brake pedal is further depressed, the compression spring 36 is further compressed, and eventually the spring retainer 35 comes into contact with the reaction receiver 34 (i.e. the length M=0). At that time (i.e. when the point E in FIG. 4 is reached), the spring force of the compression spring 36 no longer acts on the transmission of force between the input rod 16 and the output rod 27. Consequently, the line segment representing the input/output characteristics bends at the point E, and the boosting ratio becomes approximately equal to that in the output region B (see the output region F in FIG. 4).

Figure 8:
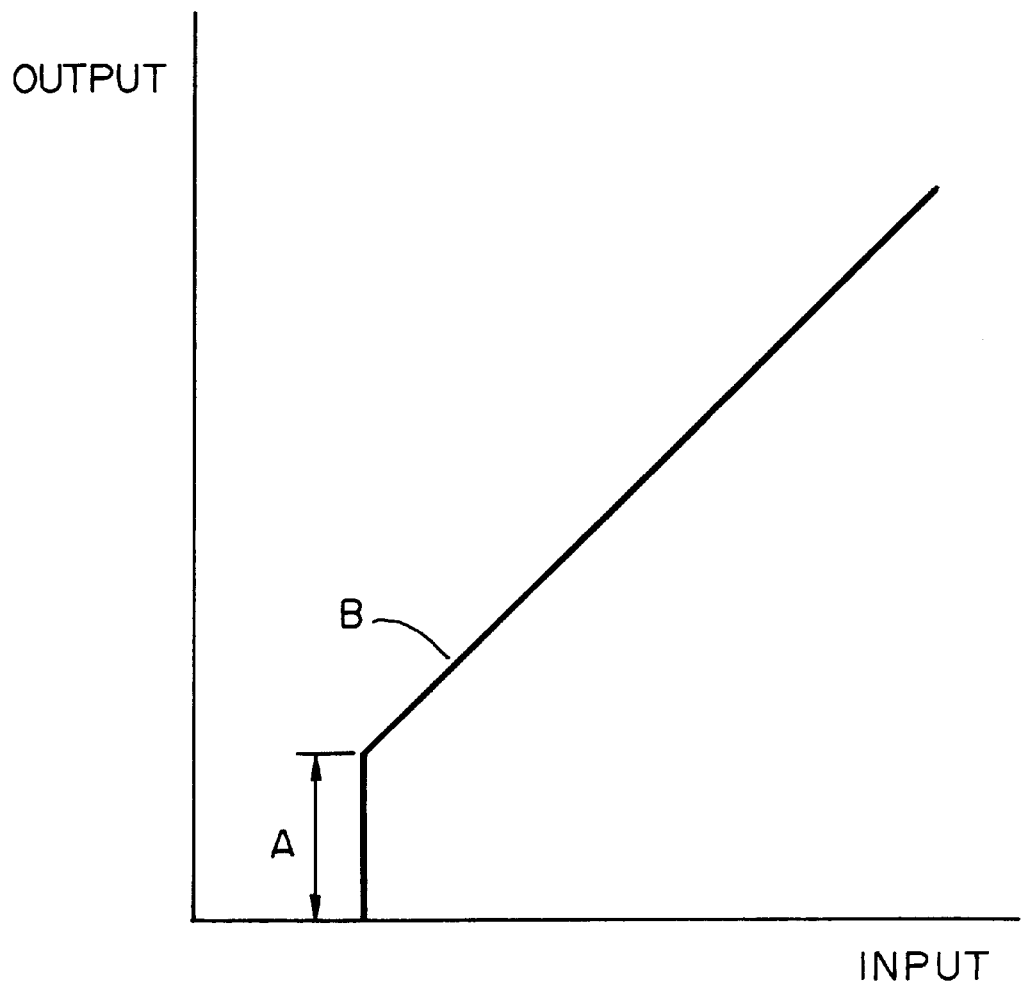
FIG. 8 is a diagram showing input/output characteristics of the prior art for comparison with FIG. 4.

According to this embodiment, the braking system has the reaction-adjusting mechanism 32 and can exhibit the input/output characteristics (2-ratio characteristics) in the output regions B and D shown in FIG. 4, as stated above. In contrast, a conventional braking system of the type that does not have the reaction-adjusting mechanism 32 cannot obtain such 2-ratio characteristics. The input/output characteristics of the conventional braking system are such as those shown in FIG. 8.

As has been stated above, when the input exceeds a predetermined point (C), the rate of increase in the output increases. Therefore, an increased braking force can be obtained even if the increase in the brake pedal pressure is small. Accordingly, even in the case of a medium level of emergency, an increased braking force can be produced speedily with a relatively small brake pedal pressure in comparison to the conventional system having no reaction-adjusting mechanism 32. Thus, it is possible to achieve an improvement in safety.

The controller 39 monitors an output signal sB from the stroke sensor 38 and obtains a stroke speed VB by performing a differential computation for the stroke signal sB at intervals of a predetermined time. When the stroke speed VB exceeds a reference value Seo of the stroke speed threshold value, the controller 39 energizes the solenoid 21 to attract the armature 23. Accordingly, the atmospheric valve 24 is opened independently of the position of the plunger 20. Consequently, the atmospheric air is introduced into the variable-pressure chamber 8 to produce a pressure difference between the vacuum in the constant-pressure chamber 7 and the pressure (atmospheric pressure) in the variable-pressure chamber 8. Thus, the power pistons 6a and 6b, together with the output rod 27, are moved forward by a thrust corresponding to the pressure difference, thereby performing a full-power braking operation, which is usable in the case of an extremely high level of emergency.

As has been stated above, the reaction-adjusting mechanism 32 contributes to an improvement in safety in a situation of medium level of emergency. Therefore, the forced full-power braking executed by the solenoid 21 can be used restrictively in the case of a high level of emergency. That is, with the required safety ensured, the reference value Seo of the stroke speed threshold value can be set high to prevent unnecessary braking. Therefore, it becomes unnecessary to strictly pursue compromising setting of a threshold value, which has been needed in the above-described prior art. Accordingly, it is possible to dispense with threshold correction processing such as that executed at steps S3, S4 and S5 (see FIG. 7) in the prior art. Therefore, the arrangement of the controller 39 can be correspondingly simplified, and the control can be sped up.

Figure 5:
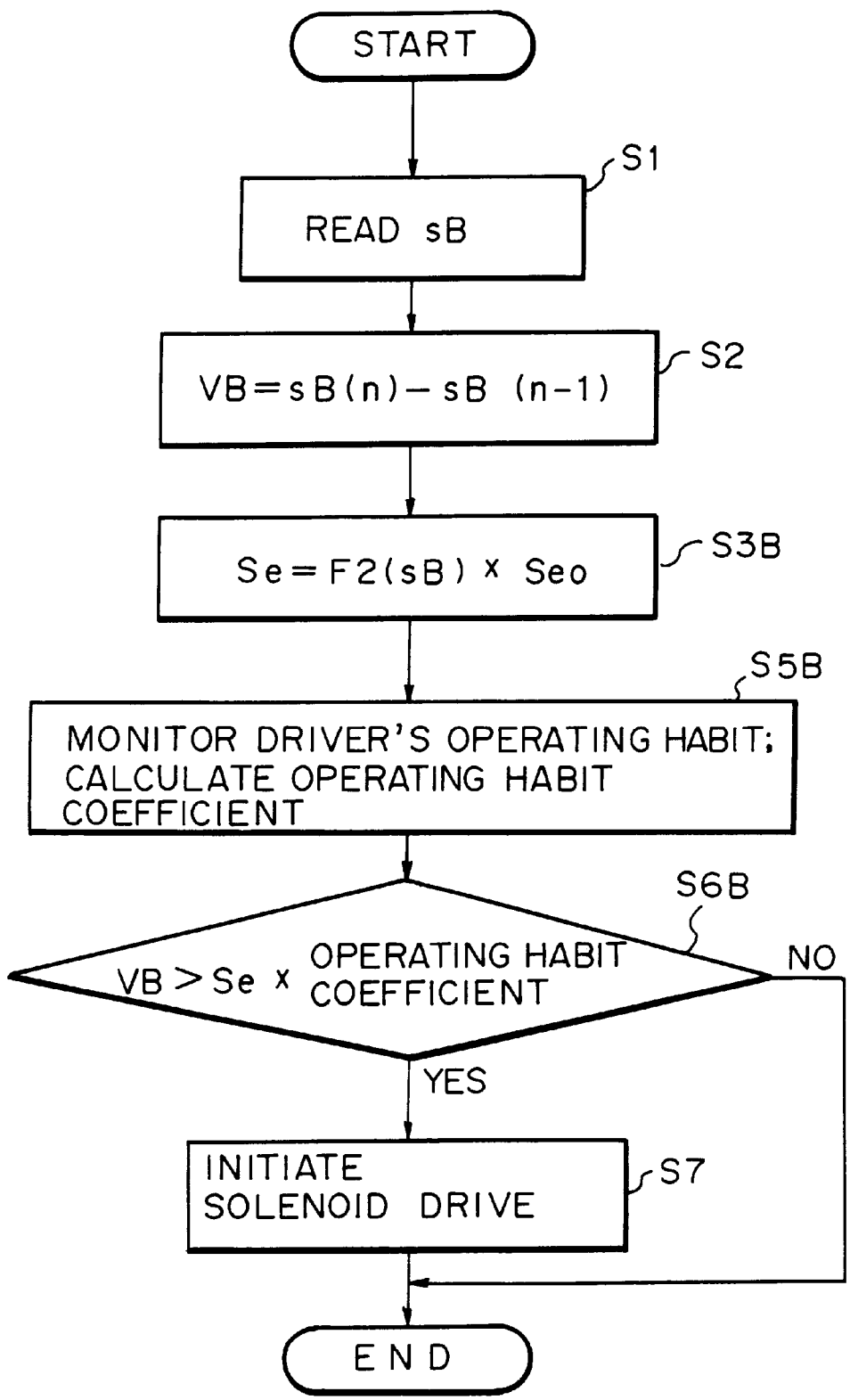
FIG. 5 is a flowchart showing the contents of a control operation executed by a controller of a braking system according to a second embodiment of the present invention.

Next, a second embodiment of the present invention will be described with reference to FIG. 5.

The controller 39 in the second embodiment executes a control operation in which steps S1, S2 and S7 are executed as in the case of FIG. 3, and step S6B is provided in place of step S6A in FIG. 3. In addition, steps S3B and S5B are provided between steps S2 and S6B. At step S3B, the reference value Seo of the stroke speed threshold value is multiplied by a stroke coefficient F2(sB) to calculate a stroke speed threshold value Se.

At step S5B, a driver's operating habit monitor processing is executed, and an operating habit coefficient is calculated, as in the case of FIG. 7.

At step S6B, the stroke speed threshold value Se and the operating habit coefficient are multiplied together to obtain a corrected threshold value. Then, it is judged whether or not the stroke speed VB is greater than the corrected threshold value (i.e. the threshold value corrected by the operating habit coefficient).

The second embodiment dispenses with threshold correction processing such as that executed at step S4 in the prior art and also dispenses with the calculation using the vehicle speed coefficient F1(V) at step S3. Therefore, the arrangement of the controller 39 can be correspondingly simplified, and the control can be sped up. Brake monitor processing executed at step S4 in the prior art generally needs vehicle deceleration information. Therefore, it becomes unnecessary to provide a signal input circuit for vehicle speed calculation and unnecessary to execute speed calculation processing because there is no need of vehicle deceleration information and calculation using the vehicle speed coefficient F1(V). Accordingly, the system can be simplified.

Although the foregoing embodiments use the reaction-adjusting mechanism 32 having a spring member (compression spring 36), another type of reaction-adjusting mechanism may be used in place of it, in which a recess (medium-diameter bore 50b) is formed in the valve body 9, and the effective pressure-receiving area of the plunger 20 is varied according to the magnitude of the output reaction force by the recess (medium-diameter bore 50b).

Figure 6:
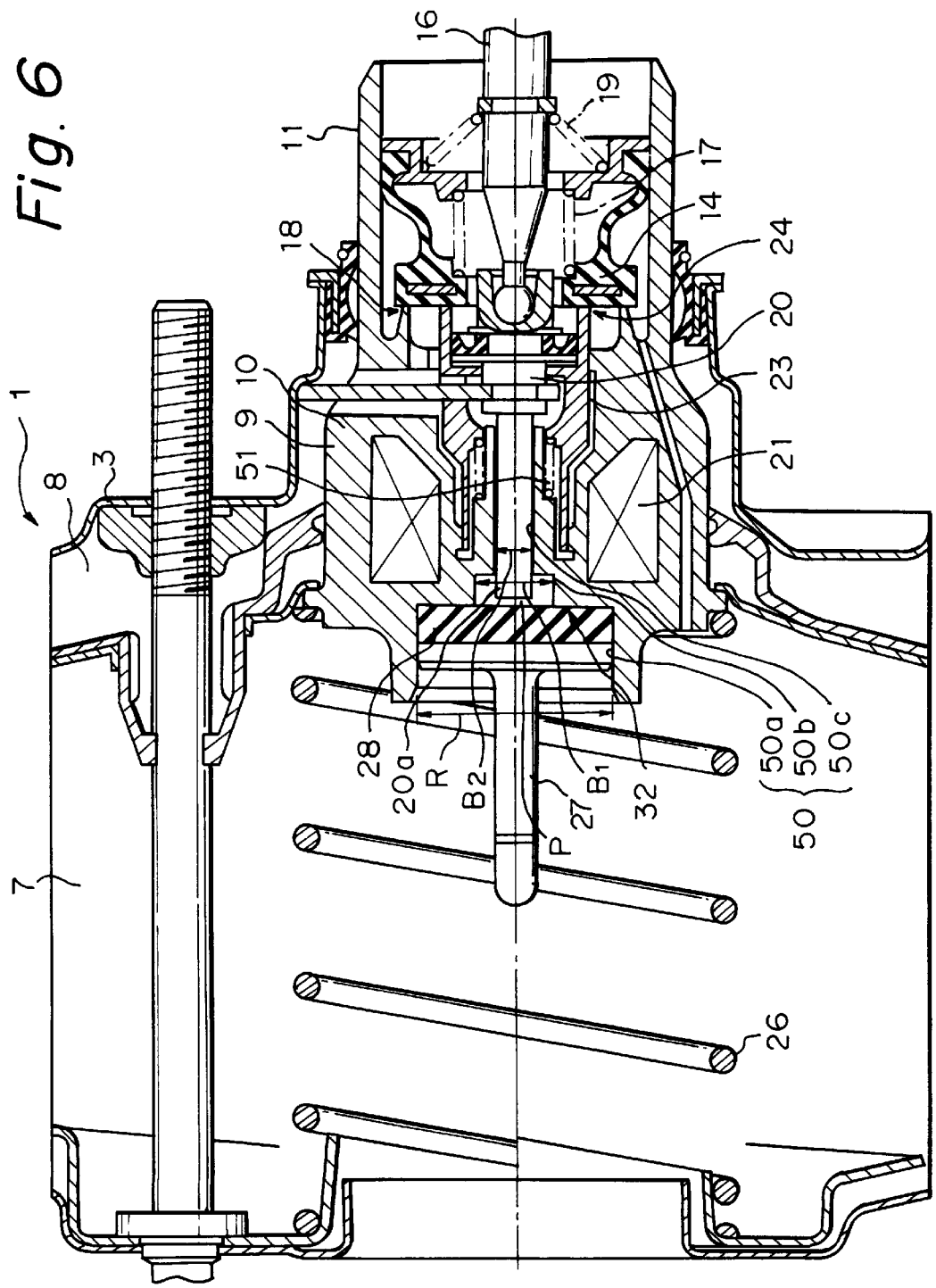
FIG. 6 is a sectional view showing a braking system according to a third embodiment of the present invention.

FIG. 6 shows an example of the above-described arrangement (i.e. a third embodiment of the present invention).

In FIG. 6, members common to the first embodiment, which are shown in FIG. 1, and the third embodiment are denoted by the same reference characters, and a description thereof is omitted appropriately. It should be noted that the braking system according to the third embodiment has a pair of constant- and variable-pressure chambers 7 and 8 unlike the above-described tandem type (having two pairs of constant- and variable-pressure chambers 7 and 8).

Referring to FIG. 6, the valve body 9 has a thick-walled large-diameter cylindrical portion 10. The large-diameter cylindrical portion 10 has a through-bore 50 consisting essentially of three bores stepwisely different in inner diameter, i.e. a large-diameter bore 50a, a medium-diameter bore 50b, and a small-diameter bore 50c. The proximal end portion of the output rod 27 and the reaction disk 28 are accommodated in the large-diameter bore 50a.

The plunger 20 has a generally columnar end shaft portion 20a at the distal end thereof. The end shaft portion 20a extends through the small-diameter bore 50c to project in the medium-diameter bore (recess) 50b. Under normal circumstances, a gap (jump-in clearance) P is formed between the distal end of the end shaft portion 20a and the reaction disk 28. The sectional area of the reaction disk 28 is set at R. The area of the medium-diameter bore (recess) 50b is set at $B_1$, and the sectional area of the end shaft portion 20a is set at $B_2$ ($B_1 > B_2$).

The large-diameter cylindrical portion 10 has an annular groove 51 formed in a portion thereof closer to the input rod 16. The annular groove 51 opens toward the input rod 16. The armature 23 is inserted in the annular groove 51 in such a manner as to be movable back and forth. The large-diameter cylindrical portion 10 has a solenoid 21 buried therein to drive the armature 23.

In the system shown in FIG. 6, at an initial stage of braking, the input rod 16 is pushed, and the plunger 20 moves through a distance corresponding to the gap P formed between the distal end of the end shaft portion 20a and the reaction disk 28. Consequently, the atmospheric valve 24 is opened without receiving a reaction force from the reaction disk 28. Therefore, it is possible to obtain a sufficient initial braking force (see the jump-in quantity shown in the output region A in FIG. 4).

Thereafter, when the plunger 20 further moves forward and pushes the reaction disk 28, a part of the reaction disk 28 swells toward the medium-diameter bore 50b. At this time, the output reaction force applied to the plunger is roughly equal to what is left when a reaction force received by the valve body 9 is subtracted from the reaction force from the reaction disk 28. That is, the output reaction force applied to the plunger has a value corresponding to the area $B_1$. The boosting ratio is $R/B_1$ (see the output region B in FIG. 4).

When the reaction disk 28 further swells to such an extent that the swelling portion of the reaction disk 28 reaches the step portion between the medium-diameter bore 50b and the small-diameter bore 50c, the step portion is also subjected to the output reaction force. At this time, the output reaction force applied to the plunger 20 is what is left when a reaction force received by the valve body 9 is subtracted from the reaction force from the reaction disk 28. That is, the output reaction force applied to the plunger has a valve corresponding to the area $B_2$. The boosting ratio is $R/B_2$ ($>R/B_1$) (see the output region D in FIG. 4).

In this embodiment, a recess (medium-diameter bore 50b) is formed in the valve body 9 so that the effective pressure-receiving area of the plunger 20 is varied according to the magnitude of the output reaction force by the recess (medium-diameter bore 50b), as stated above, thereby obtaining 2-ratio characteristics such as those shown in FIG. 4.

In this embodiment, the boosting ratio can be changed according to the size of the area of the medium-diameter bore (recess) 50b. Accordingly, it is possible to change the setting of braking force in the case of a medium level of emergency with relative ease.

Although in the above-described embodiment the control valve device (armature 23 and solenoid 21) is provided in the valve body 9, it should be noted that the present invention is not necessarily limited thereto, and that the control valve device may be provided outside the housing 1 in communication with the variable-pressure chamber (front and rear variable-pressure chambers 8a and 8b) to supply the working fluid to the variable-pressure chamber.

According to the present invention, 2-ratio characteristics can be obtained by adjusting the output through the reaction-adjusting mechanism, and the control valve device supplies the working fluid to the variable-pressure chamber on the basis of a driving signal from the control-valve drive control device. Therefore, a high boosting ratio can be obtained independently of the operation of the reaction-adjusting mechanism. Accordingly, the reaction-adjusting mechanism contributes to an improvement in safety in a situation of medium level of emergency. On the other hand, the forced full-power braking executed by the control-valve drive control device can be used restrictively in the case of a high level of emergency. Therefore, it becomes unnecessary to strictly pursue compromising setting of a threshold value, which has been needed in the prior art. Accordingly, it is possible to dispense with threshold correction processing which has heretofore been required to perform braking of high accuracy. Hence, the arrangement of the control system can be simplified, and the control can be sped up.

According to one embodiment of the present invention, the reaction-adjusting mechanism includes a reaction receiver provided between a reaction member and a plunger so as to be movable relative to the plunger and able to abut on the reaction member. A spring member is provided between the reaction receiver and the plunger. An adjusting member is provided between the reaction receiver and the plunger to adjust the initial separation between the reaction receiver and the plunger and the set load of the spring member that is applied to the reaction receiver. Because the set load of the spring member is adjusted by the adjusting member, it is possible to adjust the point at which the boosting ratio begins to change.

According to another embodiment of the present invention, the effective pressure-receiving area of the plunger is varied according to the magnitude of the output reaction force by a recess. Because the boosting ratio can be changed according to the size of the recess, it is possible to change the setting of braking force in the case of a medium level of emergency with relative ease.

What is claimed is:

1. A braking system comprising:

a booster having a housing; a power piston that divides an interior of said housing into a constant-pressure chamber and a variable-pressure chamber; a valve body supported by said power piston; and a valve mechanism provided in said valve body to control supply of a working fluid into said variable-pressure chamber by movement of a plunger connected to an input rod interlocked with a brake pedal, wherein a thrust that is produced in said power piston by a differential pressure produced between said variable-pressure chamber and said constant-pressure chamber on a basis of an operation of said valve mechanism is transmitted to an output rod, and part of a reaction force from said output rod is transmitted through a reaction member and said plunger to act on said input rod;

a control valve provided in communication with said variable-pressure chamber of said booster to supply the working fluid into said variable-pressure chamber in response to a driving signal inputted thereto;

a stroke detect or for detecting a stroke of said brake pedal;

drive control means for said control valve that compares a stroke speed of said brake pedal based on a result of detection by said stroke detect or with a preset threshold value and, when said stroke speed exceeds said threshold value, outputs a driving signal to said control valve; and a reaction-adjusting mechanism that, when the part of reaction force from said output rod that is transmitted through said reaction member and said plunger to act on said input rod has reached a predetermined value, reduces a rate of increase of the reaction force acting on said input rod to a level lower than that before said predetermined value is reached.

2. A braking system according to claim 1, wherein said valve mechanism includes a valve element provided in said valve body; said plunger; and an armature having a valve seat portion adapted to abut on said valve element and an engagement portion engageable with said plunger, said armature being movable in said valve body and urged such that said engagement portion normally abuts on said plunger;

said control valve including said armature and a solenoid that generates magnetic force acting on said armature such that said armature separates from said valve element; and said reaction-adjusting mechanism including a reaction receiver provided between said reaction member and said plunger so as to be movable relative to said plunger and able to abut said reaction member; a spring member provided between said reaction receiver and said plunger; and adjusting means, provided between said reaction receiver and said plunger, to adjust a pre-load of said spring member that is applied to said reaction receiver.

3. A braking system according to claim 2, wherein said reaction receiver has an axial bore and said adjusting means comprises an adjusting rod having a shaft portion and an enlarged head portion, said adjusting rod being press-fit in said axial bore, and a hat-shaped spring retainer mounted on the distal end of said plunger and having a cylindrical portion and a flange so that said spring is retained between said reaction receiver and the flange, said cylindrical portion having a bottom provided with an opening for passing said shaft portion of the adjusting rod, wherein the space between said reaction receiver and said bottom of the spring retainer is smaller than the space between said head portion of the adjusting rod and said distal end of the plunger.

4. A braking system according to claim 1, wherein said drive control means includes means for determining at least one of a stroke coefficient and an operation habit coefficient so that said threshold value is corrected on the basis of said at least one of the stroke coefficient and the operation habit coefficient.

5. A braking system according to claim 1, wherein said valve mechanism includes a valve element provided in said valve body; said plunger and an armature having a valve seat portion adapted to abut on said valve element and an engagement portion engageable with said plunger, said armature being movable in said valve body and urged such that said engagement portion normally abuts on said plunger;

said control valve including said armature and a solenoid that generates magnetic force acting on said armature such that said armature separates from said valve element; and said reaction-adjusting mechanism having a recess formed in a portion of said valve body that is in contact with said reaction member, said recess accommodating a distal end of said plunger, so that the ratio of the portions of the reaction force received by the valve body and the plunger, respectively, varies according to a magnitude of output reaction force.

6. A braking system according to claim 5, wherein said drive control means includes means for determining at least one a stroke coefficient and an operation habit coefficient so that said threshold value is corrected on the basis of said at least one of the stroke coefficient and the operation habit coefficient.

* * * * *